United States Patent
Panek et al.

(10) Patent No.: US 9,367,775 B2
(45) Date of Patent: Jun. 14, 2016

(54) TONER LIMIT PROCESSING MECHANISM

(71) Applicants: Alexandru-Virgil Panek, Ghiroda (RO); John Thomas Varga, Longmont, CO (US)

(72) Inventors: Alexandru-Virgil Panek, Ghiroda (RO); John Thomas Varga, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/603,619

(22) Filed: Jan. 23, 2015

(65) Prior Publication Data

US 2015/0139542 A1    May 21, 2015

Related U.S. Application Data

(63) Continuation of application No. 13/780,270, filed on Feb. 28, 2013, now Pat. No. 8,971,621.

(51) Int. Cl.
| | |
|---|---|
| G06K 9/36 | (2006.01) |
| G06K 15/02 | (2006.01) |
| G06K 15/00 | (2006.01) |
| G06F 3/12 | (2006.01) |

(52) U.S. Cl.
CPC .......... *G06K 15/1823* (2013.01); *G06F 3/1204* (2013.01); *G06F 3/1205* (2013.01); *G06F 3/1206* (2013.01); *G06F 3/1254* (2013.01); *G06F 3/1257* (2013.01); *G06F 3/1285* (2013.01); *G06K 15/1878* (2013.01); *G06K 15/407* (2013.01); *G06K 15/4065* (2013.01)

(58) Field of Classification Search
CPC .. G06T 11/00; G06T 3/4015; H04N 1/32112; H04N 2201/3243; G02F 1/133514; G02F 1/133516; G09G 3/3607; G09G 5/02; G09G 5/24; G09G 5/28; G06F 3/1204; G06F 3/1205; G06F 3/1206; G06F 3/1254; G06F 3/1257; G06F 3/1285; G06K 15/1823; G06K 15/1878; G06K 15/4065; G06K 15/407

USPC ......... 382/166; 358/1.9, 538, 518, 1.17, 1.16; 345/89, 87, 88

See application file for complete search history.

(56) References Cited

U.S. PATENT DOCUMENTS

| | | | | |
|---|---|---|---|---|
| 5,647,010 A * | 7/1997 | Okubo | ..................... | G07D 7/20 283/902 |
| 6,188,385 B1 * | 2/2001 | Hill | ..................... | G09G 3/20 345/468 |
| 6,243,070 B1 * | 6/2001 | Hill et al. | ..................... | 345/589 |
| 6,356,359 B1 | 3/2002 | Motamed | | |
| 6,396,505 B1 * | 5/2002 | Lui et al. | ..................... | 345/613 |
| 6,577,291 B2 * | 6/2003 | Hill et al. | ..................... | 345/89 |
| 6,782,217 B1 * | 8/2004 | Ando | ..................... | 399/79 |
| 7,116,444 B2 | 10/2006 | Barry et al. | | |
| 7,359,088 B2 * | 4/2008 | Clark et al. | ..................... | 358/1.9 |
| 7,437,100 B2 * | 10/2008 | Kiryu | ..................... | 399/167 |
| 7,804,629 B2 | 9/2010 | Jacobs et al. | | |
| 8,009,316 B2 * | 8/2011 | Varga | ..................... | G06T 11/00 358/1.16 |
| 8,121,501 B2 * | 2/2012 | Mashiba | ..................... | 399/45 |
| 8,180,230 B2 | 5/2012 | Klassen | | |
| 8,254,002 B2 | 8/2012 | Nakahara | | |
| 8,289,572 B2 | 10/2012 | Ernst et al. | | |

(Continued)

*Primary Examiner* — Mekonen Bekele
(74) *Attorney, Agent, or Firm* — Blakely, Sokoloff, Taylor & Zafman LLP

(57) ABSTRACT

A method is disclosed. The method includes analyzing a meta-data structure corresponding to each tile of a sheetside image to detect a blank state of the sheetside image, detecting a sensing display item in a data stream and scanning the sheetside image in response to detecting the sensing display item.

16 Claims, 7 Drawing Sheets

(56) References Cited

U.S. PATENT DOCUMENTS

| | | | |
|---|---|---|---|
| 8,971,621 B2* | 3/2015 | Panek | G06K 15/407 358/1.16 |
| 2001/0019416 A1* | 9/2001 | Monty | H04N 1/00132 358/1.9 |
| 2004/0070784 A1 | 4/2004 | Shannon | |
| 2006/0119897 A1* | 6/2006 | Morikawa | 358/3.27 |
| 2008/0165379 A1* | 7/2008 | Zuber | B41J 29/393 358/1.9 |
| 2009/0109510 A1* | 4/2009 | Varga | G06T 11/00 358/538 |
| 2011/0013241 A1* | 1/2011 | Ohara | 358/518 |
| 2012/0050786 A1 | 3/2012 | Rudolph et al. | |
| 2014/0241628 A1* | 8/2014 | Panek | G06K 15/407 382/166 |

* cited by examiner

TONER LIMIT PROCESSING MECHANISM

The present patent application is a Continuation application claiming priority from application Ser. No. 13/780,270, filed Feb. 28, 2013 which is currently pending.

FIELD OF THE INVENTION

This invention relates generally to the field of printing systems. More particularly, the invention relates to image processing.

BACKGROUND

In a variety of document presentation systems such as printing systems, it is common to rasterize data to generate a bitmap representation of each sheetside image of the document by processing a sequence of data objects. The data objects are typically initially defined in a page description language or other suitable encoding and at some point prior to writing to a bitmap are represented as regions of rectangles of pixels. Typically, the sheetside image is then generated into a bitmap memory as a two dimensional matrix of pixels representing the intended document sheetside image, and subsequently compressed.

During sheetside processing, a toner limit process may be implemented in which maximum values of toner (or ink) is monitored and, if necessary, reduced. Such monitoring and reduction involves many calculations. For example, over 134 million calculations of an algorithm may be required for CMYK (e.g., 4 planes) data included in 1,200 dpi bitmaps of an 8.5 by 11 inch page.

If the limit of toner or ink is exceeded (based on the current limit due to object type), the values of the cyan, magenta, and yellow planes must be proportionately reduced to prevent the appropriate limit from being exceeded. This is a large amount of calculation that reads and writes large amounts of memory (typically in excess of 0.5 GB per letter side). As print speeds increase, the amount of time required per page becomes prohibitive.

Accordingly, an efficient toner limit processing mechanism is desired.

SUMMARY

In one embodiment, a method is disclosed. The method includes analyzing a meta-data structure corresponding to each tile of a sheetside image to detect a blank state of the sheetside image, detecting a sensing display item in a data stream and scanning the sheetside image in response to detecting the sensing display item.

BRIEF DESCRIPTION OF THE DRAWINGS

A better understanding of the present invention can be obtained from the following detailed description in conjunction with the following drawings, in which.

DETAILED DESCRIPTION

Efficient toner limit processing and colors and blank detection mechanisms are described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
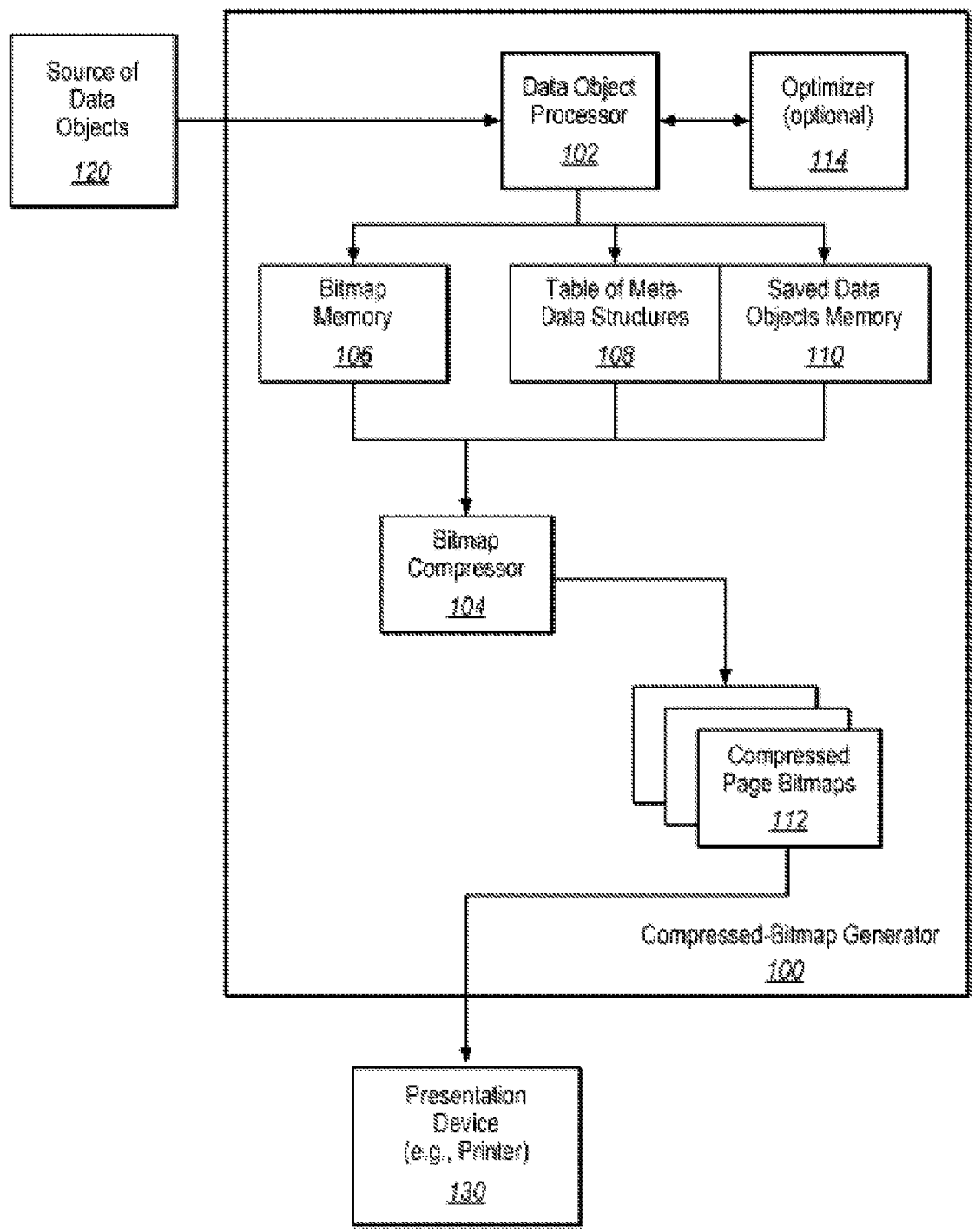
FIG. 1 is a block diagram illustrating one embodiment of a system that processes data objects to generate compressed bitmaps utilizing meta-data structures.

FIG. 1 is a block diagram of a system 100 for generating compressed bitmaps. A source of data objects 120 provides a sequence of data objects that represent a sheetside image. Data object processor 102 processes the sequence of data objects to generate a sheetside image represented in bitmap memory 106 and/or in a table of meta-data structures 108. Each sheetside image causes generation of a compressed page bitmap 112 by operation of the bitmap compressor 104.

Such a sequence of compressed page bitmaps 112 may represent a stored document or job to be transmitted to a presentation device 130. Presentation device 130 may be, for example, a printer and thus the sequence of compressed page bitmaps 112 may represent a print job or document to be printed by a printer.

Data object processor 102 processes the data objects representing information to be presented on a sheetside image. The data objects as received may be encoded in any of several well-known encoding standards such as page description languages and other document description standards. A data object may represent, for example, text or graphical information to be positioned within the sheetside image of the document. Thus, data object processor 102 is generally operable to process the data object by storing information derived from the data object in the bitmap memory 106 and/or in associated meta-data structures 108.

In one embodiment, data object processor 102 utilizes a table of meta-data structures 108 to reduce the need to write bitmap memory 106 for each data object and thus reduce utilization of memory bandwidth between data object processor 102 and bitmap memory 106. Reduced utilization of bitmap memory bandwidth improves efficiency of the generation of the corresponding compressed bitmaps by speeding the generation of the uncompressed sheetside image.

Specifically, data object processor 102 stores information relating to portions of bitmap memory 106 in corresponding entries of meta-data structure table 108. Processing of many data objects affecting portions of the bitmap memory 106 may be completed by simply updating information in corresponding entries of meta-data structure table 108. Other, or subsequent, data objects may require that the bitmap memory 106 be written in accordance with data represented by the data object.

Data object processor 102 therefore determines in processing each data object for the sheetside image whether portions of the data object must be written to portions of bitmap memory 106 or whether they may be compactly represented in corresponding meta-data structures within the table of meta-data structures 108 without requiring writing of portions of bitmap memory 106.

In one embodiment, a significant number of data objects may be represented by compact meta-data structures in table 108 and thus processor 102 may avoid the necessity of writing pixel by pixel information into bitmap memory 106. Some simple data objects such as those representing a solid color (e.g., a cleared bitmap or a solid color in a portion of the bitmap) may be represented in very compact form in meta-data structures of table 108 without requiring writing of any data in bitmap memory 106. Even more complex data objects such as a transparency masks or an opaque image may be represented compactly in a meta-data structure in table 108.

Processor 102 retains the received data objects in memory 110 and the meta-data structures may indirectly point to the saved data objects that are compactly represented thereby. Again with such a compact representation in the meta-data structure, data object processor 102 may reduce the volume of memory bandwidth utilization required to generate data objects.

Compressed-bitmap generator 100 also includes bitmap compressor 104 to generate compressed data representing a compressed page bitmap 112 following completion of the generation of a sheetside image by data object processor 102. When data object processor 102 has completed processing of a sequence of data objects representing a particular sheetside image, bitmap compressor 104 is operable to retrieve each meta-data structure and to generate compressed data in a compressed page bitmap 112 based on the information stored in the meta-data structure.

Where a meta-data structure provides sufficient information to generate a compressed representation of the corresponding portion of bitmap data, bitmap compressor 104 need not read bitmap memory 106 to generate a portion of the compressed page bitmap 112. Where the meta-data structure indicates that the corresponding portion of the bitmap contains the data to be compressed, bitmap compressor 104 reads the indicated portion of bitmap memory 106 to generate the corresponding portions of compressed page bitmaps 112.

Figure 2:
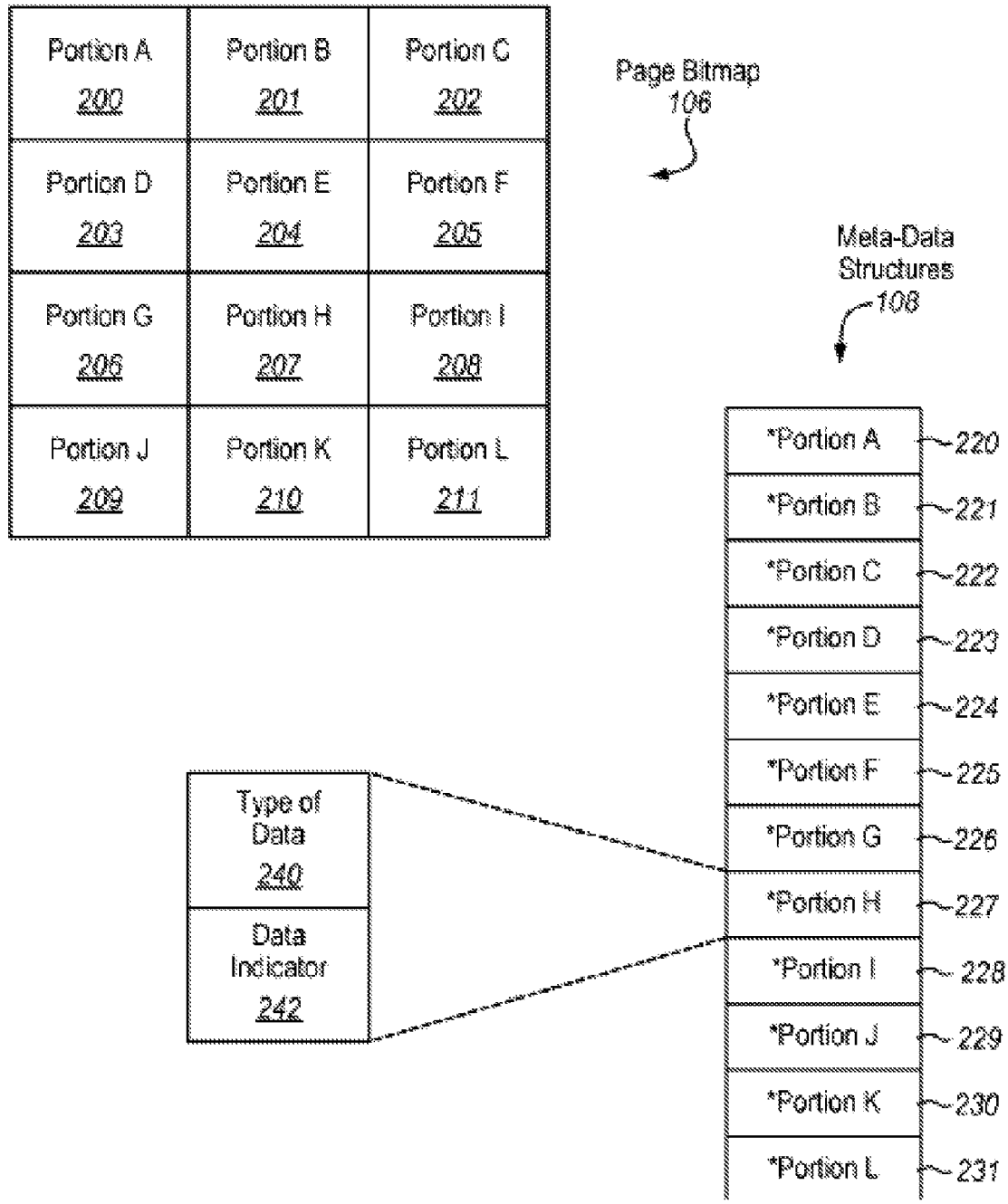
FIG. 2 is a block diagram illustrating one embodiment of a description of an association of each meta-data structure in a table of structures with a corresponding portion of the page bitmap memory.

FIG. 2 is a block diagram illustrating one embodiment of a relationship between a plurality of portions (or tiles) of a bitmap memory 106 and the table of meta-data structures 108. As shown in FIG. 2, bitmap memory 106 is logically subdivided into a plurality portions (or tiles) that may all be of equal size.

In one embodiment, bitmap 106 includes a plurality of identically sized, rectangular portions 200 through 211 ("Portion A" through "Portion L"). Each portion has a corresponding entry (220 through 231) in the table of meta-data structures 108. In particular, meta-data structure table 108 entry 220 ("*Portion A") includes information regarding the corresponding "Portion A" 200 of the bitmap memory 106. In like manner meta-data structure entry 221 ("*Portion B") corresponds to "Portion B" 201 of bitmap memory 106, etc.

Any suitable number of portions may be predefined in accordance with features and aspects hereof. Thus the number of such portions (200-211), the corresponding number of meta-data structures (221-231) in table 108, and the associated size of each of the portions may be predetermined and statically fixed within the system.

In one embodiment, each meta-data entry (220 through 231) includes a type of data field 240 and a data indicator field 242. The type of data field 240 indicates a type of data presently associated with the corresponding portion (200 through 211) of bitmap memory 106. Data indicator field 242 points (indirectly) at the saved data object that is presently associated with the portion corresponding to the meta-data structure. In a further embodiment, data indicator field 242 may directly encode the data of the data object presently associated with the portion.

Returning again to operation of data object processor 102 of FIG. 1, if the data derived from a data object were written to bitmap memory 106, the data may span one or more portions of the bitmap memory 106. As data object processor 102 processes data objects, for each portion of the bitmap memory 106 that would be affected by writing the data object, the corresponding meta-data structure in table 108 is updated to record information regarding the effect the data object would have on corresponding portions of the bitmap memory 106.

For example, if a data object would affect "Portion A" 200 and "Portion B" 201, data object processor 102 updates meta-data structures "*Portion A" 220 and "*Portion B" 221. Depending on the particular new data object and the current data compactly represented by the meta-data structure of a portion of the bitmap, updating the meta-data structures 220 and 221 may suffice to represent the new data object without needing to write data into the bitmap memory portions 200 and 201.

In one embodiment, the type of data field 240 of a meta-data structure entry may indicate that the corresponding portion of the bitmap memory is a "compact" type of data or a "non-compact" type of data. A data indicator field 242 represents the data of the corresponding portion in a compact form.

Most generally, if the data that would be in a portion of the bitmap memory may be compactly represented in the meta-data structure without requiring that the data be written to the corresponding portion of the bitmap memory, then the type of data for the affected meta-data structure is "compact" and the data indicator field represents the new data for the corresponding portion of the bitmap memory If the data that would be in a portion cannot be compactly represented in the meta-data structure, the type of data for the affected meta-data structure is "non-compact" and the data object/objects are simply written to the corresponding portion of the bitmap memory. Those of ordinary skill will recognize that these particular "type of data" values ("compact" and "non-compact") are intended mere as exemplary.

More specifically, a "compact" type of data indicates that the data of the corresponding portion of the bitmap is compactly represented by the information in the meta-data structure and hence is not written in the corresponding portion of the bitmap memory. For example, the bitmap memory at the start of processing of a sheetside image is logically cleared (e.g., a solid white background often represented as zeros in the bitmap memory).

As data objects are processed for the sheetside image, portions of the bitmap and corresponding meta-data structures may be affected by the processed data objects. A "compact" type of data in the meta-data structure for such an affected portion of the bitmap then indicates that some data object has been processed that has affected the corresponding portion of the bitmap and that the effect on the corresponding portion is represented compactly in the meta-data structure by the data indicator field.

For example, the data indicator field may indirectly point to the data object in the saved data object memory. In another example, the data indicator field may directly represent that data object by an encoded value (such as the color of a rectangular data object that affects the corresponding portion of the bitmap memory). Hence, the portion of the bitmap memory corresponding to a meta-data structure having the "compact" data type has no relevant information written therein thus reducing bitmap memory bandwidth utilization that would be required to write the data objects to the bitmap memory.

A "non-compact" type of data indicates that the data of the corresponding portion of the bitmap cannot be compactly represented in a meta-data structure alone for any of various reasons (i.e., cannot be adequately represented by the data indicator field). In such a case, the data object or objects that affect the corresponding portion of the bitmap memory are simply written to the bitmap memory.

Numerous conditions may arise to preclude a "compact" type of data representation for a portion of the bitmap. Other conditions may arise where, as a matter of design choice, the portion could be represented by either a "compact" type of data or by a "non-compact" type of data in the corresponding meta-data structure. Based on cost/benefit implementation details for a particular application it may be determined that a "compact" representation is not desired.

For example, added computational complexity to compactly represent combinations of data objects overlapping within a portion may be too high although the particular overlapping data could be represented compactly. In another example, if image objects are a rarity in a particular application, there may be little benefit in compactly representing image data objects in a "compact" type of data meta-data structure.

In yet another example, where image objects are frequent and often overlapping in portions of the bitmap memory (e.g., a photo montage), significant benefits may be realized in assuring that portions with such overlapping image objects are compactly represented whenever possible to avoid using bitmap memory bandwidth to write image data that is likely to be overwritten by a later image data object. These and other heuristics and design choices will be readily apparent enhancements to the features and aspects hereof to optimize the systems and methods for particular applications.

According to one embodiment, an optional optimizer element 114 may be operable in system 100 to analyze the efficiency of the number and size of the portions for a particular set of data objects. Based upon such analysis, optimizer 114 may adjust the size and number of such portions and correspondingly adjust the number of meta-data structures in table 108. For certain types of documents or jobs, fewer such portions of larger size may provide optimal results in processing sheetside images.

In other types of documents or jobs, a larger number of smaller portions may provide optimal sheetside image processing. Where the portions are all of equal shape and size, the association between a meta-data structure (220 through 231) and its corresponding portion (200 through 211) of the bitmap memory 106 may be determined by a simple indexing calculation to associate the meta-data structure by its index position within the table 108 with its corresponding bitmap memory portion. Where the number, size, and/or shape of the bitmap portions are variable, each meta-data structure (220 through 231) may include suitable addressing information to identify its corresponding portion (200 through 211) of the bitmap memory.

Figure 3:
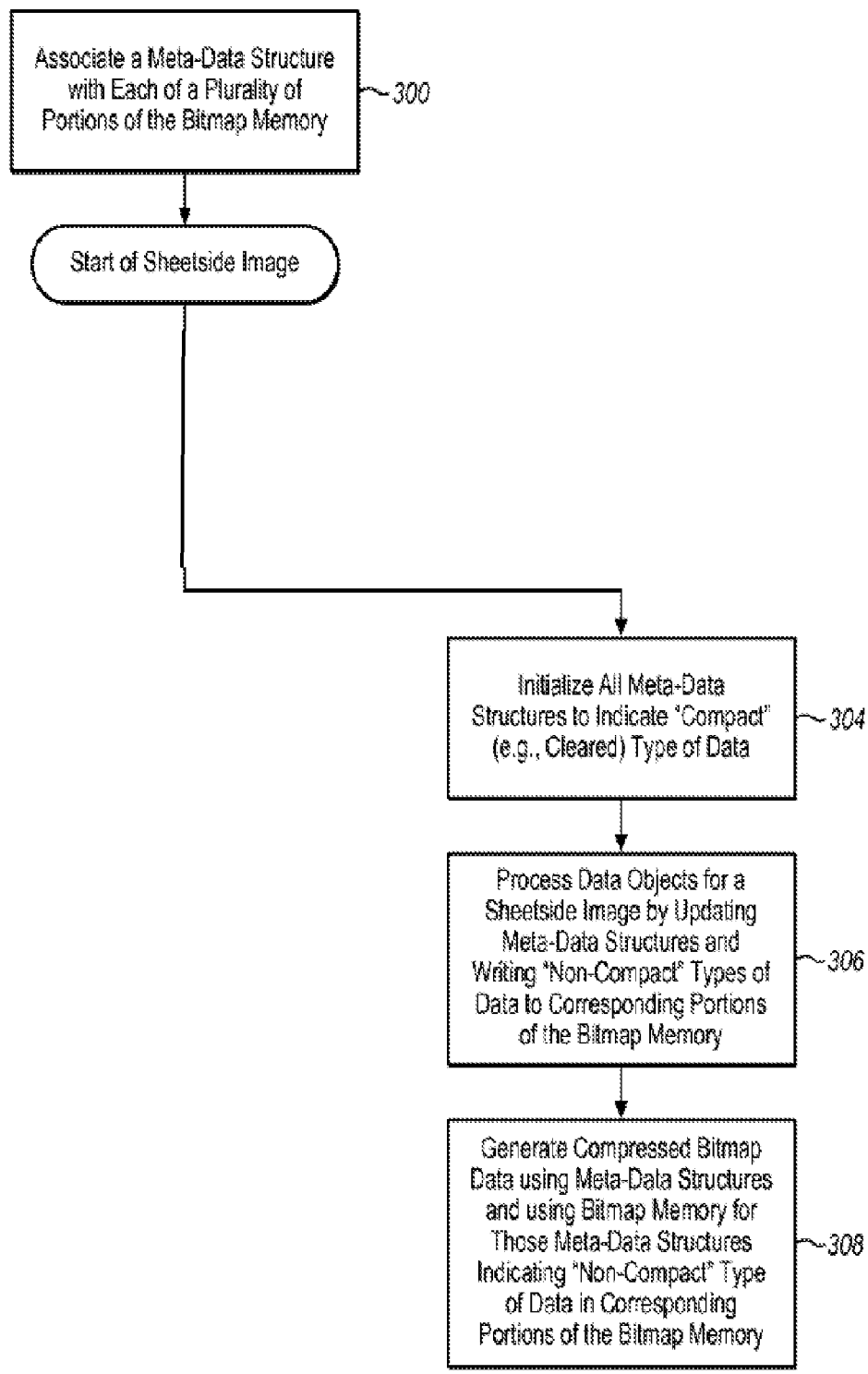
FIG. 3 is a flow diagram illustrating one embodiment of processing data objects representing a sheetside image utilizing meta-data structures.

FIG. 3 is a flow diagram illustrating one embodiment of processing data objects representing a sheetside image utilizing meta-data structures. Processing block 300 associates a meta-data structure with each of a plurality of portions of the bitmap memory. As noted above, the number of such portions, and hence the number of corresponding meta-data structures, may be statically predetermined or may be dynamically determined by optimization analysis in the processing of sheet side images. Processing block 300 therefore represents any suitable determination of an initial number of such portions and initialization of corresponding meta-data structures.

Prior to processing any data object, processing block 304 sets the type of data field of every meta-data structure to "compact" and the data indicator field is set to zero values (or other values representing a cleared state) to represent the cleared state of the bitmap memory at the start of generating a sheetside image (e.g., a "white" or "blank" sheetside image or a "cleared" sheetside image pre-set to a defined background color).

Processing of the sheetside image then continues to processing block 306 where the data object processor is operable to process the data objects corresponding to a sheetside image. The processing for each data object includes updating the meta-data structures for any corresponding portions of the bitmap that would be affected if data derived from the data object were to be written in the bitmap memory. The type of data field in each meta-data structure corresponding to an affected portion of the bitmap is updated to indicate the type of data now associated with the bitmap portion.

The data indicator field for each meta-data structure corresponding to an affected portion of the bitmap is also updated to represent the new data object that is associated with the corresponding portion of the bitmap. Exemplary details of the processing of processing block 306 for determining which portions of the bitmap memory may be affected by processing of the data object and associated processing to update corresponding meta-data structures are discussed further herein below. In general, the type of data field is updated to indicate changes in the corresponding affected portion of the bitmap from a "compact" type of data to a "non-compact" type of data.

Following completion of processing of the data objects for a sheetside image at processing block 306, processing block 308 represents processing of the bitmap compressor of system 100 to generate a compressed bitmap data representation of the sheetside image. The bitmap compressor uses each meta-data structure to determine from the type of data field whether the compressed data may be generated exclusively from the information in the meta-data structure (e.g., for "compact" types of data) or whether the compressed data must be generated by reading the data stored in the corresponding portion of the bitmap memory (e.g., for "non-compact" type of data). Thus, processing of the bitmap compressor in processing block 308 further reduces bitmap memory bandwidth utilization by avoiding the need to read bitmap memory for portions containing non-"non-compact" types of data.

Rather, for such "compact" types of data, the meta-data structure alone provides sufficient information for the bitmap compressor to generate compressed data representing the corresponding portion of the bitmap. Completion of the processing of processing blocks 304 through 308 thus generates a compressed bitmap representation of a sheetside image with reduced utilization of the bitmap memory bandwidth.

Figure 4:
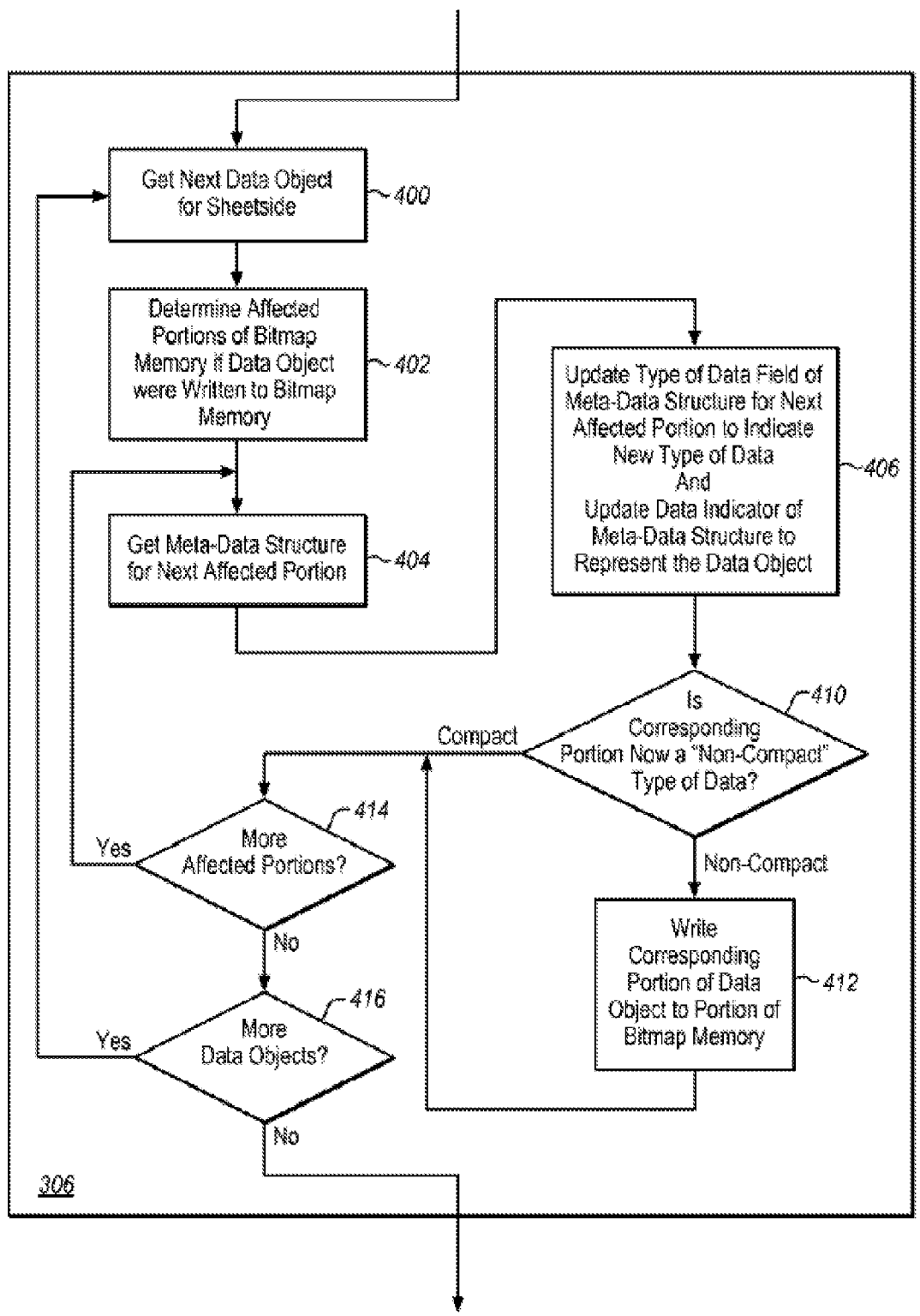
FIG. 4 is a flow diagram illustrating one embodiment of processing data objects for a sheetside.

FIG. 4 is a flow diagram illustrating one embodiment of processing data objects for a sheetside. Processing block 400 gets the next (or first) data object for the sheetside image to be generated. Processing block 402 then determines which portions of the bitmap memory would be affected by the data object if the data object were written to the bitmap memory by standard bitmap processing techniques. The portions affected may be determined by comparing geometric parameters of the object (e.g., bounding box dimensions and position of the object on the bitmap) with the dimensions of the various portions. For each portion of the bitmap that would be affected by the data object, processing blocks 404 through 414 are repeated.

Processing block 404 gets the next (first) meta-data structure corresponding to a next affected portion of the bitmap. Processing block 406 then updates the type of data field of the meta-data structure to indicate any change to the field in accordance with the particular data object. In addition, processing block 406 updates the data indicator of the meta-data structure to represent the data object being processed if the object is to be compactly represented in the meta-data structure.

Exemplary additional details of processing block 406 are discussed further herein below. In general, the data type field of the meta-data structure is updated to indicate "compact" if the affect of the data object on the corresponding portion of the bitmap memory will be compactly represented by the meta-data structure fields (in combination with the saved data object represented by the data indicator field).

If the effect on the portion will not be compactly represented by the meta-data structure, the type of data field is updated to indicate a "non-compact" type of data and the affect of the data object is actually written to the corresponding portion of the bitmap (processing block 412 below). For example, overlaying certain data objects by other data objects may not be compactly represented (in some cases) and hence the data object is simply written to the corresponding affected portion of the bitmap memory. However, before the data object is written into the corresponding affected portion of the bitmap memory, if there are previous objects that are to remain visible in that portion, the compact data is first written into the portion to initialize the memory to the prior object(s).

Alternatively, as a matter of design choice certain objects or combinations of objects may be written to the bitmap for optimization consideration in a particular application. In other embodiments, portions or edges of a data object may cover only part of a portion of the bitmap. Again, as a matter of design choice such partial coverage of a portion by an object may or may not be represented by the corresponding meta-data structure.

These and other heuristic decisions may be employed within the processing of processing block 406 to determine in what conditions the affected portion can be and will be represented compactly by the meta-data structure. Thus in processing block 406, a determination is made as to whether it is possible to compactly represent the affected portion and whether it is desirable to do so in a particular application.

Processing block 410 determines whether the meta-data structure type of data field has been updated to indicate a "non-compact" type of data. If so, processing block 412 writes the corresponding portion of the bitmap memory with the rasterized data derived from the data object. In either case, processing continues at processing block 414 to determine whether additional affected portions remain to be processed.

If so, processing continues looping back to processing block 404 to process meta-data structures corresponding to other affected portions and processing of this data object. If not, processing block 416 next determines whether additional data objects remain to be processed for this sheetside image. If so, processing continues looping back to processing block 400 to retrieve and process a next data object for the current sheetside image. Otherwise processing of this sheetside image is completed.

In one embodiment, updating the meta-data structure, as referred to in processing block 406 comprises determining whether the affected portion will be compactly represented by the corresponding meta-data structure. As noted above, this determination may entail determining not only whether the affected portion can be represented compactly but also determining whether it is desirable to do so based on design choices in the implementation of features and aspects hereof.

For example, it may be possible to compactly represent a portion of a bitmap even if the data object affects only part of the portion of the bitmap. Additionally, it may be possible to compactly represent a portion of a bitmap even if multiple objects overlay one another in particular ways within the affected portion.

If the new object cannot be compactly represented by the meta-data structure, it is next determined whether the meta-data structure presently indicates that the corresponding portion is already written with data from one or more prior objects (e.g., already indicates a "non-compact" type of data in the meta-data structure). If so, processing is complete. Otherwise the type of data is changed to "non-compact" and all previously represented data objects to the affected portion of the bitmap is written Specifically, the data that is represented by the present meta-data structure is written to the corresponding portion of the bitmap memory. In other words, the currently represented "compact" type of data object/objects represented in the meta-data structure is/are written to the corresponding portion of the bitmap memory.

Since these previously processed objects have not yet been written to the bitmap, they must be written to the affected portion before the data derived from the new data object is written in the affected portion. Subsequently, the type of data is set to "non-compact" to complete processing of this meta-data structure and corresponding bitmap portion affected by the new data object.

If it is determined that the present meta-data structure indicates that the new object can be compactly represented by the meta-data structure (and if it is determined to be desirable as a matter of design choice), it is next determined whether the new object will affect a change of the affected portion. For example, if the meta-data structure indicates a "compact" type of data that indicates a solid color is represented and if the new data object does not change that color (e.g., because it is the same color or transparent), then the new object would not change the portion and processing is complete.

If it is determined that the data object changes the meta-data representation of the corresponding portion, the type of data field is updated (or set) to indicate a "compact" type of data and the data indicator field is set to represent the new data object (e.g., indirectly point to the saved data object or otherwise directly encode the data object in the data indicator field). Processing of this meta-data structure corresponding to an affected portion of the bitmap is then complete.

In one embodiment, an effect a data object may have on one or more portions of the bitmap that it overlays depends on the particular semantic of the data object. Any of a variety of data objects may be encountered depending upon design choices in implementation of features and aspects hereof. In general all objects may be considered as a collection of pixels—each pixel having some value indicating a color and/or indicating a transparency value.

In general, all objects are represented as a 2-dimensional array of such pixel values (e.g., a rectangular bounding box of pixel values). The value of a pixel may be encoded in a number of manners. For example, full color data objects may be defined as a pixel intensity value for each of three primary color planes and the color black. In another example, each pixel may simply encode an index value into a table of predefined colors (e.g., a palette). Further, each pixel value may encode a transparency level indicating that the pixel is transparent (i.e., has no color—no effect on the bitmap) or has some opaque color value (with the color specified by the value as indicated above).

Features and aspects hereof may be used with any and all such data object encodings and shapes. In one embodiment, data objects may be classified in one of four broad categories: rectangle, transparency mask, palette, and image with possible transparency and/or translucency.

A "rectangle" is any data object that represents a rectangular area where the pixels of the rectangular area each represent a specified opaque color. Thus, a rectangle object is typically defined by its geometric dimensions and a single color value. A rectangle may thus be compactly represented in a portion of the bitmap by a corresponding meta-data structure as a "compact" type of data where the data indicator field either points to the saved data object or encodes the dimensions and color of the rectangle.

A "transparency mask" is any data object (typically also rectangular in shape though not necessarily) where each pixel of the mask is either a "transparent" bit or an "opaque" bit of some specified color. This kind of data object is also sometimes referred to as a "bi-level image". Text is often represented as such a transparency mask. The glyph representing a character code or a sequence of such glyphs are represented as opaque pixels (all of the same color) against a bounding box background of transparent bits that do not affect the bitmap memory. When writing such a transparency mask to bitmap memory, the opaque pixels are written to the bitmap memory and the transparent pixels have no effect such that whatever was previously in the corresponding pixel locations of the bitmap memory remains unchanged. Typically the transparency mask is defined as a rectangular area with the transparent and opaque pixels defined therein. A transparency mask may thus be compactly represented in a portion of the bitmap by a corresponding meta-data structure as a "compact" type of data where the data indicator field points to the saved data object.

A "palette" is any data object that defines a shape (often a rectangular area) filled with one or more colors where the colors are selected from a limited set of colors (a palette). Thus, the colors are specified as index values in the relatively small range of palette values. In one embodiment of such a palette object, one palette color index value is reserved to represent a "transparent pixel" and all other palette color index values represent other corresponding colors in the palette. A palette data object may thus be compactly represented in a portion of the bitmap by a corresponding meta-data structure as a "compact" type of data where the data indicator field points to the saved data object.

An "image" data object is any object where each pixel has a pixel value in a color spectrum. Photographic images are exemplary of such an image object. An image is typically defined as a rectangular area of such pixel values. An image may thus be compactly represented in a portion of the bitmap by a corresponding meta-data structure as a "compact" type of data where the data indicator field points to the saved data object. Further, the pixels of an image object may be compressed and encoded according to a number of well known standards such as LZW and JPEG standards.

When data objects of these exemplary types are associated with portions by means of positioning the data object on a sheetside, the data object can be represented by a series of portions aligned with the portions of the underlying sheetside. Some affected portions of the bitmap memory are completely filled and some are only partially filled depending on the position of the data object on the sheetside. For example, a rectangle data object may include portions only partially affected by the data object at a boundary of the rectangle (i.e., showing the edges of the rectangle) and solid portions (i.e., the center areas, completely filled by the rectangle). Similarly, other types of objects (e.g., image data objects, transparency mask data objects, and palette data objects) may affect portions of the bitmap differently where the object completely fills a portion versus portions that are only partially affected by the data object at a boundary edge of the object. As noted above, such portions that are only partially affected by processing of a data object may nonetheless be compactly represented by the meta-data structure for that portion.

As data objects are processed to update meta-data structures corresponding to affected portions of the bitmap memory, combinations of data objects of the above types may be processed within any single affected portion (e.g., a sequence of objects may each affect a common portion each object overwriting or in some way adding to the pixels of the portion).

In one embodiment, the specific effect on a portion of the bitmap from processing a data object depends, in part, on the present type of data associated with the portion as indicated in the corresponding meta-data structure. In general, if an affected portion presently indicates a "compact" type of data in its corresponding meta-data structure, a next data object processed that completely fills the portion will typically retain the "compact" type of data but update the data indicator to represent the new object.

If the new object only partially covers the portion that is currently compactly represented by a corresponding meta-data structure, then the type of data may be changed to "non-compact" to represent the mixture of the effects of the prior data object mixed with the partial effect of the new data object.

If a "transparency mask" object is processed, its effect on any portion currently represented by a "compact" type of data meta-structure may depend on what the prior data object was. As can be seen from the above few examples, a variety of objects and combinations of objects may be represented compactly in the meta-data structure for an affected portion while other combinations of objects affecting a portion may require non-compact representation by writing to the bitmap memory portion.

As discussed above, bitmap compressor 104 generates a compressed representation of a sheetside image using the meta-data structures. In such an embodiment, the compressed data may be generated by stepping through each horizontal line across the bitmap memory (e.g., each scanline) and generating compressed data from the meta-data structures that intersect each scanline.

In a further embodiment, compressed data is generated according to a PackBits compression scheme (e.g., PackBits) for run-length encoding of the bitmap data. PackBits compresses raw data by looking for repeated strings having the same 8-bit value. A control byte is used to indicate repeat (negative values) or pass-thru (positive values) data. The absolute value of the control byte is the number of repeated or passed-thru values decremented by 1.

For instance, values 0 thru 127 indicate that 1 thru 128 passed-thru values will follow the control byte, while values −1 thru −127 indicate that the following value is repeated for a total of 2 thru 128 times. The value −128 is not defined, and thus may be used in non-standard ways. In one embodiment, 3 or more identical 8-bit data values are coded as a repeat sequence (e.g., 0 0 0 raw 8-bit data is coded as −2 0). Further, a string of non-identical data values is coded as a pass-thru (or literal) string (e.g., 21 22 23 24 raw data is coded as 3 21 22 23 24).

After a sheetside is compressed, the bitmap data is later processed for printing. Specifically, the data may be retrieved, decompressed and processed for printing. For instance, processing may involve converting the bitmap to a size commensurate with a printing bitmap. Also, additional bitmaps (e.g., N-up) or other data ((e.g., header/footer, watermark, etc.) may need to be added and/or overlaid.

In conventional processes, decompressing and re-compressing the data requires data in the PackBits format to be converted to image data, and subsequently back to the PackBits format. Such a process is inefficient in the use of memory, as well as in the time incurred for the PackBits decompression and compression.

According to one embodiment, retrieved PackBits data is left in that format and used in the generation of the subsequent sheetside generation, thus eliminating the compression and decompression times. In such an embodiment, a new object classification is introduced such that the broad categories now includes a PackBits object type, in addition to the rectangle, transparency mask, palette and image classifications discussed above.

In a further embodiment, a PackBits object location is saved as rectangle data, where the background color is solid and a PackBits "color" refers to a similar offset of PackBits data. Moreover, transparency data may be stored with PackBits data to allow blending and bleed through, where transparent areas show only solid background color. Non-solid backgrounds (e.g., previous tile state) typically cause non-compact tiles if transparency is active or are not affected if the entire tile area is being overlaid with a completely transparent area.

Further, a tile having a PackBits object is processed according to the above-described mechanism such that a PackBits display item is found from a data indicator 242 pointer in the meta-data structure, and PackBits display items combined with other object types other than color create non-compact portions. Accordingly, the processing of tiles with PackBits objects is handled according to the "compact" and "non-compact" indications in the meta-data structures discussed above with reference to FIG. 4.

For example, when a PackBits object is retrieved for a sheetside image, a determination is made as to which portions of the bitmap memory affected by the PackBits object, a corresponding meta-data structure to a next affected portion of the bitmap is retrieved, the type of data field of the meta-data structure is updated to indicate a change to the field and to represent the data object being processed if the object is to be compactly represented in the meta-data structure. Thus, the effect of PackBits object processing is that data is pulled from referenced PackBits data upon encountering a PackBits tile during a subsequent bitmap processing and prior to recompression for printing.

Subsequently, the sheetside image is compressed according to processing block 308 discussed above with reference to FIG. 3. However, during compression of the sheetside image, data from PackBits objects may be simply realigned and inserted into the corresponding bitmap without compression since the objects are already in a compressed format. For instance, tiles exclusively including PackBits objects are inserted into the bitmap without decompression or further compression, while tiles mixed with PackBits objects and other objects may require additional decompression and recompression.

Toner Limits

As discussed above, sheetside processing may feature a toner limit process in which maximum values of toner/ink are monitored for possible reduction. In one embodiment, the above-described meta-data structures are implemented to monitor toner limits. In such an embodiment, the toner limit process is significantly reduced by using tile object values, where each tile represents 4096 pixels. In a further embodiment, a single calculation may be implemented to determine if a tile is over the limit, and if so, to calculate new color values for the tile.

For instance, a solid tile is a single color for which a single calculation is used to find the limited values. Further, a rectangle tile has two colors (e.g., background and foreground), and thus two calculations are performed. Also, calculations may be performed for PackBits tiles, which include many different colors. Therefore, solid, rectangle and PackBits tile metadata types con be limited using the meta-data structures.

Figure 5:
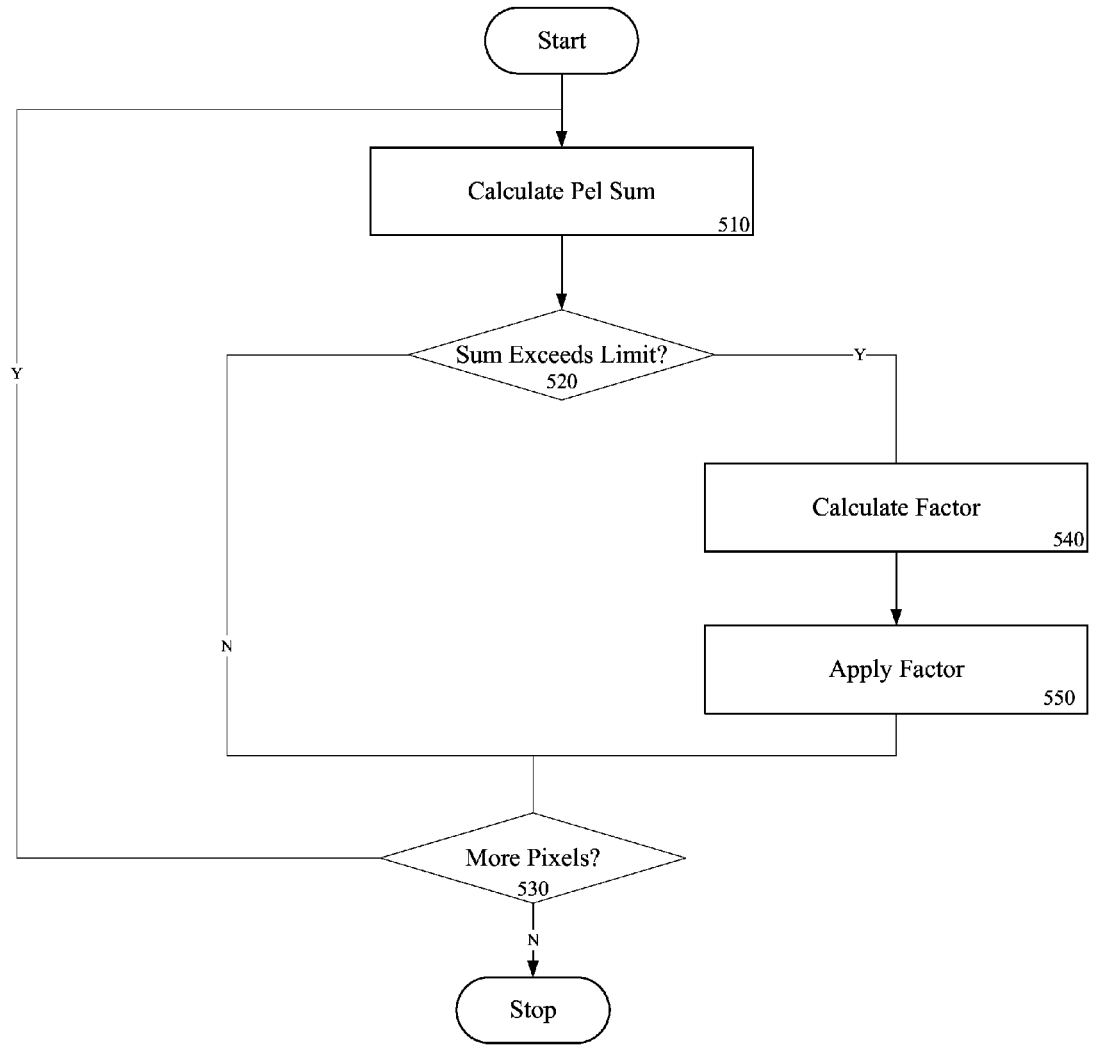
FIG. 5 is a flow diagram illustrating one embodiment of performing toner limit processing.

FIG. 5 is a flow diagram illustrating one embodiment of performing toner limit processing for a PackBits tile in a sheetside image. At processing block 510, the highest value used in each Cyan, Magenta, Yellow, Black (CMYK) color plane for a pixel is calculated. Given a CMYK (with four color planes: C, M, Y, K) sidemap with M×N pels, a sum S(i,j) is calculated as S(i,j) as C(i,j)+M(i,j)+Y(i,j)+K(i,j) for each sidemap pel (i,j), where i in [0 . . . M−1] and j in [0 . . . N−1].

At decision block 520, it is determined whether the sum S(i,j) exceeds the toner ink threshold value L (e.g., the maximum allowed amount of toner/ink per any pel of the sidemap). If the sum does not exceed the threshold, no limiting is necessary, and it is determined if additional pixels remain to be processed, decision block 530.

If the sum exceeds the threshold, a factor F(i,j) is calculated as a function of S(i,j) and L, processing block 540. If L is the ink limit and $C_{ij}$, $M_{ij}$, $Y_{ij}$, $K_{ij}$ are the ink values of the (i,j) sidmap pel, $S_{ij}=C_{ij}+M_{ij}+Y_{ij}+K_{ij}$ is calculated as the sum of the four ink values. If $S_{ij}>L$, the ink values (with the exception of $K_{ij}$) need to be limited such that $S'_{ij}=L$ (where $S'_{ij}$ is the sum of the ink values after limiting). Since $K'_{ij}=K_{ij}$ (the values of the K channel should not modified), we will determine the factor $F_{ij}$ such that $C'_{ij}+M'_{ij}+Y'=F_{ij}\times(C_{ij}+M_{ij}+Y_{ij})$ when $C_{ij}+M_{ij}+Y_{ij}+S_{ij}-K_{ij}$ and $C'_{ij}+M'_{ij}+Y'_{ij}=L-K_{ij}$. Based on the above, $L-K_{ij}=Fij\times(Sij-Kij)$ giving $$F_{ij} = \frac{L - Kij}{Sij - Kij}.$$

$F_{ij}$ is applied in the same amount to each of the $C_{ij}$, $M_{ij}$ and $Y_{ij}$ values as: $C'_{ij}=F_{ij}\times C_{ij}$, $F'_{ij}\times M'_{ij}$ and $Y'_{ij}=F_{ij}\times Y_{ij}$.

At processing block 550, the factor is applied to each color for the pixel, such that F(i,j) is applied to C(i,j), M(i,j) and Y(i,j). Subsequently, it is determined if additional pixels remain to be processed, decision block 530. If so, control is returned to processing block 510 for another pixel in the sidemap to be processed.

However the process may be complicated in certain embodiments since, besides the C, M, Y and K values, each sidemap pel may also have a tag value. (e.g.) T(i,j), where T(i,j) is [0 . . . 3] for any pel of the sidemap (e.g., there are at most four different tag values for all of the pels in the sidemap considered). If the tag values are present, there may be multiple toner/ink threshold values (e.g., one per each type of tag). Thus in such an embodiment, each pel toner/ink must be checked against the associated limit value; the above toner limit algorithm becomes in this case. Accordingly, in decision block 520, the toner ink threshold value is represented as L(i,j), and at processing block 540 the factor is calculated as a function of S(i,j) and L(i,j).

The above-described toner limit processing operates on meta-tiles to combine the tiles at the same (row,col) location in the C, M, Y, K tile tables into a single, corresponding CMYK meta-tile. For example, in the first tile position, (0,0), may have a SOLID(100) tile in plane C, a SOLID(200) tile in plane M, a RECT(50,150) tile in plane Y and a RECT(0, 250) tile in plane K. For the RECT tiles, the first numeric value is the background color while the second one is the foreground color).

In this case, provided that the RECT tiles from planes Y and K have the same rectangle coordinates, the four tiles are treated as a RECT meta-tile with the background color (C=100, M=200, Y=50, K=0) and a foreground color (C=100, M=200, Y=150, K=250). Then, two summations are performed: 100+200+50+0=350 (that is 350*100/255=137%) and 100+200+150+250=700 (or 700*100/255=275%).

If the corresponding toner threshold/limit is 290% then no limiting is necessary (e.g., skip the pel-by-pel processing) because both 137% and 275% are less than 290%. If some (C, M, Y, K) tile tuple cannot be treated as a CMYK meta-tile (e.g., if the above K tile would be MIXED or RECT with different coordinates), then all the compact tiles in that position will be transformed in non-compact tiles (rasterized) and after that the toner limit algorithm will be applied on a pel-by-pel basis.

In a further embodiment, the maximum ink value per each CMYK plane is monitored when writing the sidemap tiles. For example, all sidemaps may start as max_C=max_M=max_Y=max_K=0 values for all their pels. Then, if a solid color rectangle with a CMYK color is written max_C if C>max_C, max_M if M>max_M and so on, are updated for all the objects written on the sidemap.

When the sidemap is compressed and saved in PackBits format, these limits are saved along with the PackBits data. Subsequently, when the PackBits object is written on the destination sidemap, the destination sidemap maximum values is updated accordingly. If a toner limiting operation is requested on a sidemap, it can be skipped altogether if max_C+max_M+max_Y+max_K<=L (the limit value).

According to one embodiment, 1 to 4 streams of PackBits data are processed simultaneously for each PackBits. For example, if two tiles (let's say C and M) are SOLID with some specific background values and max_Y+max_K<=L−C−M (if the remaining leeway is sufficient/greater-than-equal to the sum of the worst-case remaining PackBits values), the meta-tile will be skipped from toner limiting.

Further, the data for simultaneous runs (e.g., all colors are identical) can be efficiently checked. When a limit is detected that is not the start of a run and the current run is repeated, that line is copied (up to the point of detection). However, when a limit is detected at the start of a run, the limited value is remembered and the existing value is replaced once the run is completed and copied.

In a further embodiment, a PackBits tile may be decompressed if a limit is found, subsequently limited according to object, and then new runs compressed back to PackBits (or done when the sheetside is compressed back to PackBits for printing). When beginning final compression, solid colors, background and foreground colors of rectangles and bi-level tiles can be replaced with limited values.

In one embodiment, the PackBits data may be copied or may remain in place for each line. Alternatively, a mapping of the original PackBits line starts may be created, copying only the lines that are altered. Subsequently, the compressed result is generated using the mapping, rather than the raw PackBits data in a line by line basis.

Color & Blank Detection

Currently, printers inspect plane data to determine if ink or toner is required on a sheetside, and may thus skip applying toner or ink to blank sheetsides. However, discovering this on the final bitmaps may prevent their usage. For example, if a color control bar is requested, it will apply toner or ink to all of the CMYK planes. However, if that is the only data on the page, the printer cannot skip any of the planes, even when they are otherwise blank.

To prevent this, some printers must check the output for each page and force a monochrome setting to all pages on a sheetside, thus switching between color and monochrome control bars. If all pages output no data, a blank sheetside is then detected and the control bar must be suppressed. This process requires synchronization so that the control bar is not known until the after rasterization. This synchronization requirement prevents a pipeline of independent activities in this area, causing slower performance.

According to one embodiment, a sensing display item (Auto Color Sense (or ACS)) is included to examine a sheetside to determine whether the sheetside is of color, monochrome or blank. Further, subsequent controls may be used based on the sensed results to prevent adding additional elements to blank planes. These are needed if final bitmaps are needed per plane. Otherwise, bitmaps are not provided to the marking engine, even though they may acquire data after the ACS (such as for the control bar).

In one embodiment, an ACS item is inserted after all user data is presented (e.g., pages and other items such as header/footer, watermarks, etc.). Subsequently, the control causes examination of the sheetside at the point in time it is encountered. A final value then notes which planes are used and which are empty. If the CMY planes are empty, the sheet side can be printed in monochrome, and if all CMYK are empty, the sheet side is blank.

In one embodiment, the above-described meta-data structures are implemented for color and blank detection. In such an embodiment, a meta-data structure is used to determine whether all tiles on a sheetside are solid and white (e.g., implying no data has been written) without having to examine the actual data.

For other tile types, the color values may also indicate that the plane has no data (e.g., 0 values in both background and foreground for a rectangle object, or 0 max value for a PackBits object). Only non-compact tiles (e.g., where tile data has been written into memory) are examined pixel by pixel for non-blank data.

In some embodiments, certain printers accept the lack of a plane as blank. However in other embodiment, printers require the actual planes. In such an embodiment, a conditional control item is implemented to turn off adding data to the sheet side for a plane based on the result of the ACS. This suppresses adding the CMY parts of a color bar, as well as other marks (e.g., watermarks) if the user data is blank. The conditional control item turns the ignoring of data off and back on based on ACS results, and is specific to each plane.

Figure 6:
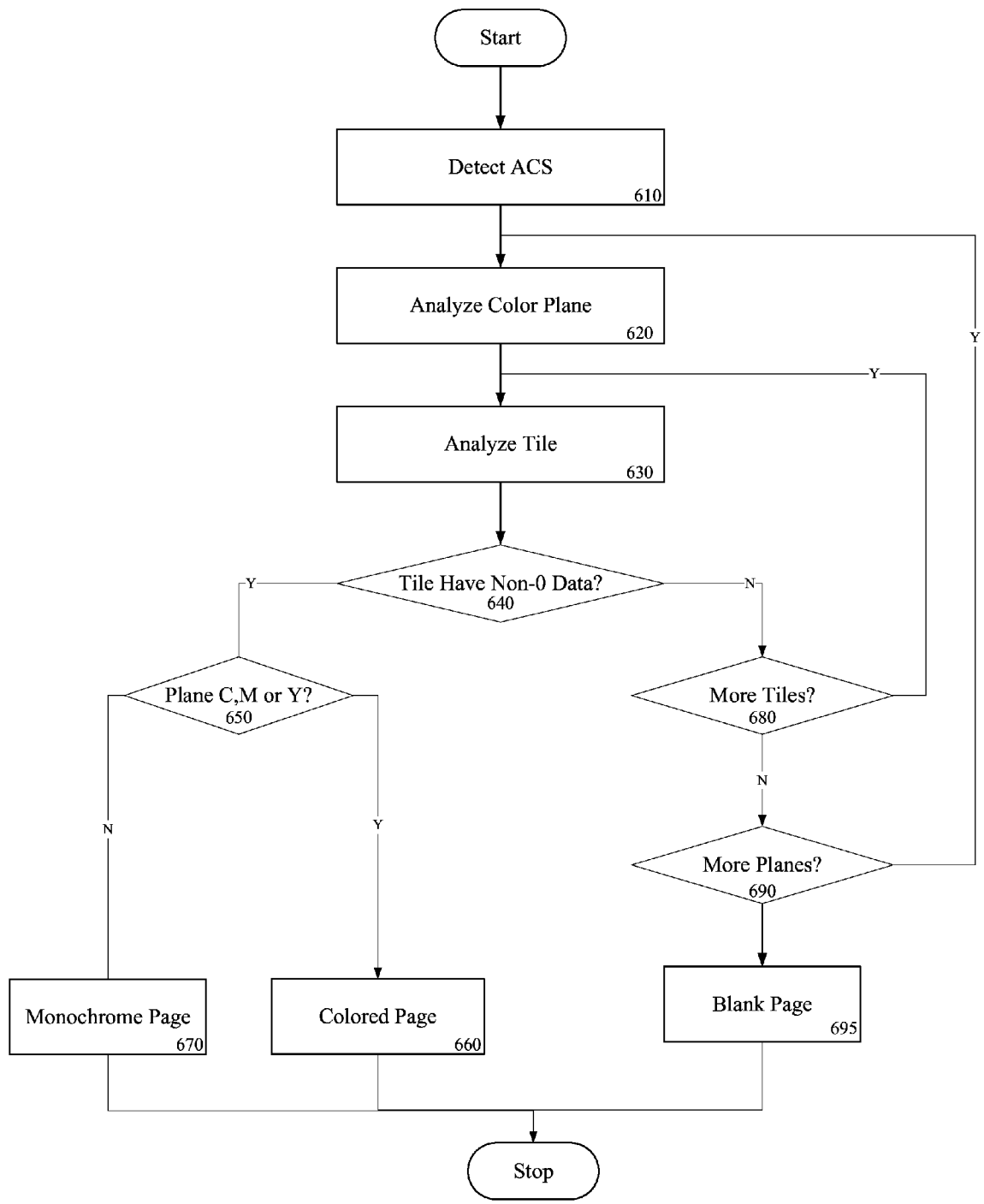
FIG. 6 is a flow diagram illustrating one embodiment of detecting colors and blanks.

FIG. 6 is a flow diagram illustrating one embodiment of detecting colors and blanks. At processing block 610, an ACS is detected after user data, resulting in the sheetside tiles being scanned. At processing block 620, a color plane (e.g., C, M, Y or K) is analyzed. At processing block 630, a tile is analyzed. In one embodiment, tiles representing solids, rectangles or text are scanned for non-blankness (e.g., a non-zero value for background and foreground), while tiles representing Pack-Bits are scanned for maximum limit values (e.g., a value of zero). Tiles representing non-compact data may be scanned line by line in search of data.

At decision block 640 it is determined whether the tile has non-zero data. If so, it is determined whether the plane being analyzed is a C, M or Y plane. If so, the sidesheet is a colored page, processing block 660. Otherwise, the plane being analyzed is black and the sidesheet is a monochrome page, processing block 670. If, at decision block 640, the tile has all zero data, there is a determination as to whether there are additional tiles in the sidesheet that need to be analyzed, decision block 680.

If so, control is returned to processing block 630, where the next tile is analyzed. However if there are no more tiles to analyzed in the current color plane, a determination is made as to whether there are additional color planes to analyze for the sidesheet, decision block 690. If so, control is returned to processing block 620, where the next color plane is analyzed. If, however, there are no additional color planes to analyze, the sidesheet is determined to be a blank page.

The above-described process enables analysis before mandatory marks are added to the sheetside. Additionally, the process allows sheetsides to be classified for overcoat (when limited to non-blanks) despite always having side-two verify data, for example. It also allows planes to be ignored (as in cut sheet), although CMY values in color control bars are added afterwards.

Although described with reference to PackBits, one skilled in the art will appreciate the above-described mechanisms may be implemented using other compression formats (e.g., Run ends).

Figure 7:
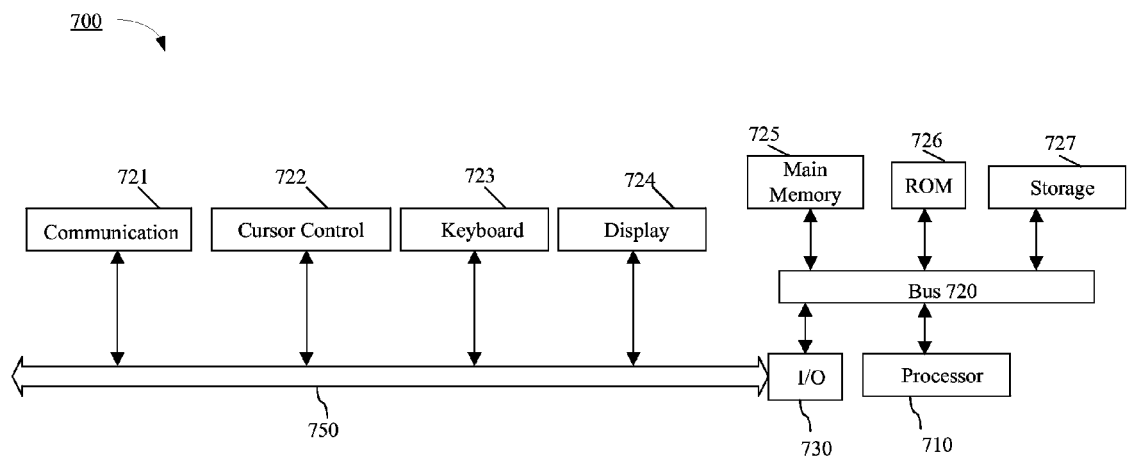
FIG. 7 illustrates one embodiment of a computer system.

FIG. 7 illustrates a computer system 700 on which compressed bitmap generator 100 and/or decompressors 125 may be implemented. Computer system 700 includes a system bus 720 for communicating information, and a processor 710 coupled to bus 720 for processing information.

Computer system 700 further comprises a random access memory (RAM) or other dynamic storage device 725 (referred to herein as main memory), coupled to bus 720 for storing information and instructions to be executed by processor 710. Main memory 725 also may be used for storing temporary variables or other intermediate information during execution of instructions by processor 710. Computer system 700 also may include a read only memory (ROM) and or other static storage device 726 coupled to bus 720 for storing static information and instructions used by processor 710.

A data storage device 725 such as a magnetic disk or optical disc and its corresponding drive may also be coupled to computer system 700 for storing information and instructions. Computer system 700 can also be coupled to a second I/O bus 750 via an I/O interface 730. A plurality of I/O devices may be coupled to I/O bus 750, including a display device 724, an input device (e.g., an alphanumeric input device 723 and or a cursor control device 722). The communication device 721 is for accessing other computers (servers or clients). The communication device 721 may comprise a modem, a network interface card, or other well-known interface device, such as those used for coupling to Ethernet, token ring, or other types of wired or wireless networks.

Embodiments of the invention may include various processing blocks as set forth above. The processing blocks may be embodied in machine-executable instructions. The instructions can be used to cause a general-purpose or special-purpose processor to perform certain processing blocks. Alternatively, these processing blocks may be performed by specific hardware components that contain hardwired logic for performing the processing blocks, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A computer generated method comprising:
    analyzing a meta-data structure corresponding to each tile of a sheetside image to detect a blank state of the sheetside image;
    determining whether a sensing display item has been detected in a data stream, wherein the sensing display item is an auto color sense inserted to the data stream after all user data is presented;
    scanning the sheetside image in response to detecting a sensing display item in the data stream; and
    disregarding the sheetside image upon determining that no sensing display item is included in the data stream.

2. The method of claim 1 further comprising:
    determining if any Cyan, Magenta or Yellow (CMY) color value is not zero; and
    determining that the sheetside image has color if one or more of the CMY values are non-zero.

3. The method of claim 2 further comprising:
    determining if any Black (K) color value is non-zero if the CMY color values are all zero; and
    determining that the sheetside image is monochrome if any K value is non-zero.

4. The method of claim 3 further comprising determining that the sheetside image is blank if no K value is non-zero.

5. The method of claim 1 wherein tiles representing solids, rectangles and text are scanned for a non-zero value in a background and foreground.

6. The method of claim 1 wherein tiles representing compressed data are scanned for maximum limit values.

7. The method of claim 5 wherein a tile having an associated solid object is processed by comparing a color value of the object to the predetermined maximum value.

8. The method of claim 5 wherein a tile having an associated rectangle object is processed by:
    comparing a first color value of the object to the predetermined maximum value; and
    comparing a second color value of the object to the predetermined maximum value.

9. An article of manufacture comprising a non-transitory computer-readable medium including instructions, which when executed performs a process comprising:

analyzing a meta-data structure corresponding to each tile of a sheetside image to detect a blank state of the sheetside image;

determining whether a sensing display item has been detected in a data stream, wherein the sensing display item is an auto color sense inserted to the data stream after all user data is presented;

scanning the sheetside image in response to detecting a sensing display item in the data stream; and disregarding the sheetside image upon determining that no sensing display item is included in the data stream.

10. The article of manufacture of claim 9 comprising a non-transitory computer-readable medium including instructions, which when executed performs a process further comprising:

determining if any Cyan, Magenta or Yellow (CMY) color value is not zero; and determining that the sheetside image has color if one or more of the CMY values are non-zero.

11. The article of manufacture of claim 10 comprising a non-transitory computer-readable medium including instructions, which when executed performs a process further comprising:

determining if any Black (K) color value is non-zero if the CMY color values are all zero; and determining that the sheetside image is monochrome if any K value is non-zero.

12. The article of manufacture of claim 11 comprising a non-transitory computer-readable medium including instructions, which when executed performs a process further comprising determining that the sheetside image is blank if no K value is non-zero.

13. The article of manufacture of claim 9 wherein tiles representing solids, rectangles and text are scanned for a non-zero value in a background and foreground.

14. The article of manufacture of claim 9 wherein tiles representing compressed data are scanned for maximum limit values.

15. The article of manufacture of claim 14 wherein a tile having an associated solid object is processed by comparing a color value of the object to the predetermined maximum value.

16. The article of manufacture of claim 14 wherein a tile having an associated rectangle object is processed by:

comparing a first color value of the object to the predetermined maximum value; and comparing a second color value of the object to the predetermined maximum value.

\* \* \* \* \*